US008896718B2

(12) United States Patent
Stedman et al.

(10) Patent No.: US 8,896,718 B2
(45) Date of Patent: Nov. 25, 2014

(54) ADVANCED VIDEO CAMERA PRIVACY LOCK

(75) Inventors: Roy Stedman, Austin, TX (US); Rocco Ancona, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 71 days.

(21) Appl. No.: 13/457,303

(22) Filed: Apr. 26, 2012

(65) Prior Publication Data
US 2013/0286225 A1 Oct. 31, 2013

(51) Int. Cl.
H04N 5/232 (2006.01)

(52) U.S. Cl.
USPC .................. 348/211.99; 348/211.4

(58) Field of Classification Search
CPC ......... H04N 5/232; H04N 5/225; H04N 5/76; H04N 9/04; H04N 7/18; G06K 9/36; G06K 9/20; G06K 9/40; G06K 13/14
USPC .......... 348/211.99, 211.3, 207.1, 231.9, 143, 348/159, 167, 170, 207.99, 161, 512, 510, 348/508, 169; 382/276, 282, 283, 260; 725/105, 25–31, 45, 46; 340/572.1, 340/572.3, 572.9, 541, 542
See application file for complete search history.

(56) References Cited

U.S. PATENT DOCUMENTS 7,227,567 B1 * 6/2007 Beck et al. ................. 348/14.07
2004/0105006 A1 * 6/2004 Lazo et al. .................... 348/169

OTHER PUBLICATIONS http://webcamerablocker.com, printed Jul. 26, 2012.

* cited by examiner

Primary Examiner — Tuan Ho
(74) Attorney, Agent, or Firm — Terrile, Cannatti, Chambers & Holland, LLP; Stephen A. Terrile

(57) ABSTRACT

A video camera privacy lock is set forth. The video camera privacy lock includes a low level filter driver that install and maintains a first position in a filter graph. The filter driver provides a locked media signal to the next sequential item rather than to a media stream until and unless the filter is unlocked. The locked media signal may be a blank screen, a text message, an icon, a static image (such as an avatar, a photograph, etc., pixilated video, or some other predetermined output). Also, in various embodiments, the driver is locked by default, thereby increasing user trust that the video camera only transmits a media signal when desired.

21 Claims, 2 Drawing Sheets

ADVANCED VIDEO CAMERA PRIVACY LOCK

BACKGROUND OF THE INVENTION

1. Field of the Invention

The present invention relates to information handling systems and more particularly to privacy locks for use with information handling system video cameras.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide information handling systems with an integrated video camera (e.g., a webcam). For example, all in one type information handling systems or portable type information handling systems may include the video camera within the housing of the system while stand alone type information handling systems may include the video camera which is associated with the display device of the information handling system. In certain systems the video camera may be integrated with the display device. In other systems, the video camera may be coupled to the information handling system and then located in proximity with the display device.

An issue has presented itself as video cameras have become more ubiquitous. This issue relates to user privacy concerns. It has been determined that users are becoming increasingly concerned about privacy issues as well as the difficulty in detecting when a video camera is enabled. This issue has become more pressing in a number of instances such as unauthorized users or applications enabling the video camera, malware that unobtrusively turns on the video camera, institutions such as school districts spying on users when they are remote from the school as well as concerns about any background information that is detectable via the video camera and general privacy issues.

To address this privacy issue it is known to provide a video camera with a physical shutter mechanism. When the shutter is open there is no blocking of the image, but when the shutter is physically closed the image is blocked. This issue has also been addressed by placing an opaque material such as tape over the video camera. Additionally, some video cameras have an indicia such as a light to indicate when the video camera is active. One issue with the indicia is there have been certain types of malware application which disable the indicia even when the video camera is active. Additionally, to address this issue certain parental controls have been introduced which disable or limit access to the video camera.

What is needed is an intuitive method to unlock video cameras when use is desired and to have confidence that the video camera is locked when use is not desired.

SUMMARY OF THE INVENTION

In accordance with the present invention, an advanced video camera privacy lock is set forth. More specifically, in certain embodiments, the video camera privacy lock provides a low level filter driver that install and maintains a first position in a filter graph (i.e., the set of software and middleware components used for multimedia processing). The filter driver provides a locked media signal to the next sequential item rather than to a media stream until and unless the filter is unlocked. The locked media signal may be a blank screen, a text message, an icon, a static image (such as an avatar, a photograph, etc., pixilated video, or some other predetermined output. Also, in various embodiments, the driver is locked by default, thereby increasing user trust that the video camera only transmits video when desired. In various embodiments, the media stream includes a video stream and an audio stream and the locked media signal includes either or both a locked video stream and a locked audio stream.

In various embodiments, the driver may be unlocked via a password, a smartcard, user gestures (such as track pad gestures). Alternately, in various embodiments, the driver may be unlocked via a camera media stream which is received via the video camera and is provided to the locking driver. With the camera media stream, the driver receives and interprets an incoming media stream to detect for example, a user gesture, facial recognition or predefined unlock keys (such as a user badge or quick response (QR) code, etc. Also, in various embodiments, the driver is relocked by detecting a camera media stream such as a user gesture, a facial recognition or predefined unlock keys (such as a user badge or QR code, etc. The relocking may occur upon removal of certain elements from the camera video stream.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
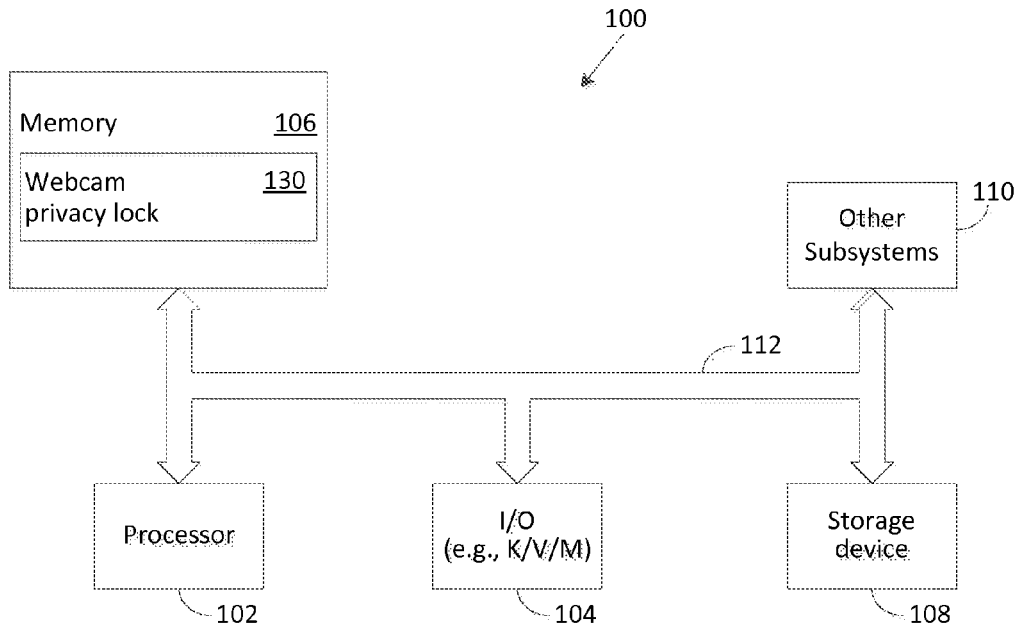
FIG. 1 shows a system block diagram of an information handling system.

Referring briefly to FIG. 1, a system block diagram of an information handling system 100 is shown. The information handling system 100 includes a processor 102, input/output (I/O) devices 104, such as a display, a keyboard, a mouse, a video camera and associated controllers (each of which may be coupled remotely to the information handling system 100), a memory 106 including volatile memory such as random access memory (RAM) and non-volatile memory such as a hard disk and drive, and other storage devices 108, such as an optical disk and drive and other memory devices, and various other subsystems 110, all interconnected via one or more buses 112. The memory 106 also stores a video camera privacy lock module 130.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
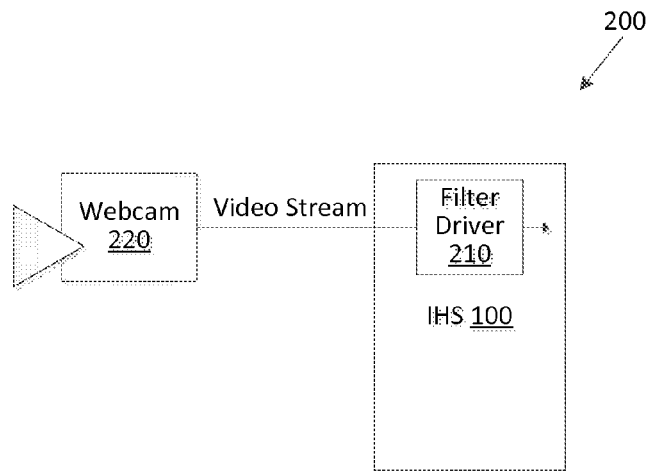
FIG. 2 shows a block diagram of an advanced video camera privacy lock.

Referring to FIG. 2, a block diagram of a video camera privacy lock system 200 is shown. More specifically, the video camera privacy lock includes a low level filter driver 210 that interacts with and controls a video camera 220. The filter driver 210 installs and maintains a first position in a filter graph. The filter driver 210 provides a locked media signal to the next sequential item (i.e., the next component to receive the video stream from the video camera 220) rather than to a media stream until and unless the filter is unlocked. The locked image may be a blank screen, a text message, an icon, a static image (such as an avatar, a photograph, etc., pixilated video, or some other predetermined output. Also, the filter driver 210 is locked by default, thereby increasing user trust that the video camera only transmits a media signal when desired. The instructions for providing the privacy lock system 200 are stored within the privacy lock module 130 and executed by the processor 102.

Figure 3:
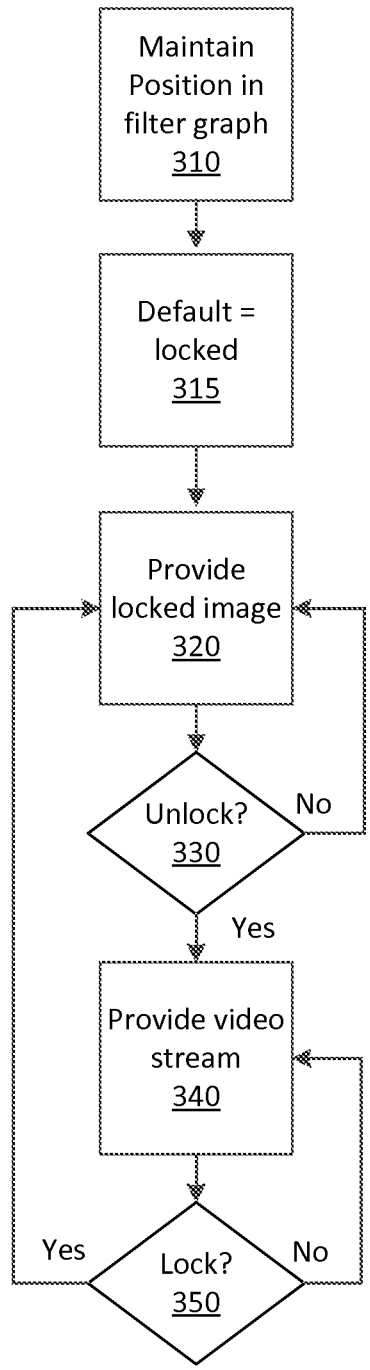
FIG. 3 shows a flow chart of the operation of an advanced video camera privacy lock.

FIG. 3 shows a flow chart of the operation of an advanced video camera privacy lock. More specifically, in operation, the filter driver 210 installs and maintains a first position in a filter graph at step 310. The default condition of the filter driver, as indicated by step 215, is locked thereby increasing user trust that the video camera only transmits a media signal when desired. The filter driver 210 provides a locked media signal to the next sequential item rather than a media stream at step 320. The locked image may be a blank screen, a text message, an icon, a static image (such as an avatar, a photograph, etc., pixilated video, or some other predetermined output.

Next, the filter driver 210 determines whether the video camera is unlocked at step 330. The driver may be unlocked via a password (e.g., a manually entered password or an audio password), a smartcard, user gestures (such as track pad gestures). Alternately, the driver may be unlocked via a camera media stream which is received via the video camera and is provided to the locking driver. With the camera media stream, the driver receives and interprets an incoming media stream to detect for example, a user gesture, facial recognition or predefined unlock keys (such as a user badge or QR code, etc. When the video camera is unlocked, then the driver 210 provides the video camera media stream to the next sequential item at step 340.

Next, at step 350, the filter driver 210 is determines whether to lock the video camera. The video camera may be relocked by detecting a camera media stream such as a user gesture, a facial recognition or predefined unlock keys (such as a user badge or QR code, etc. The relocking may occur upon removal of certain elements from the camera video stream.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, in certain embodiments, the filter driver 210 may interact with malware protection software such as virus or spyware prevention software to determine whether certain events for locking or unlocking the video camera are allowable. This interaction may function similarly to that of a firewall software where certain input, such as certain recognized faces or badges, automatically unlock the video camera.

Also for example, in certain embodiments, the filter driver 210 may be configured to allow an administrator such as an information technologies (IT) administrator to control locking and/or unlocking of the media signal based on user policies, time of day or other conditions.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for providing a camera lock function to an information handling system comprising:
 executing a filter driver to control the camera;
 maintaining the filter driver in a locked condition so that a media stream from the camera is not passed beyond the filter driver, the maintaining the filter driver in the locked condition providing a camera privacy lock to the camera; and, upon detection of a predetermined event, transitioning the filter driver to an unlocked condition, the unlocked condition transmitting the media stream from the camera to a next sequential item of the information handling system.

2. The method of claim 1 wherein:
the filter driver maintains a first position within a filter graph, the filter graph comprising a set of software and middleware components used for multimedia processing.

3. The method of claim 1 wherein:
the locked condition further comprises provided a locked media signal to the next sequential item.

4. The method of claim 3 wherein:
the media signal further comprises at least one of a blank screen, a text message, an icon, a static image, and a pixilated video steam.

5. The method of claim 1 wherein:
the filter driver is locked by default, thereby increasing user trust that the camera only transmits the media stream when desired.

6. The method of claim 1 wherein:
the filter driver is unlocked via at least one of a password, a smartcard, user gestures, and a camera media stream received by the camera.

7. The method of claim 1 wherein:
the filter driver is relocked upon detection of a predetermined media signal.

8. An information handling system comprising:
a processor;
memory coupled to the processor, the memory storing a camera lock system for performing a camera lock operation, the camera lock system comprising instructions executable by the processor for:
executing a filter driver to control the camera;
maintaining the filter driver in a locked condition so that a media stream from the camera is not passed beyond the filter driver, the maintaining the filter driver in the locked condition providing a camera privacy lock to the camera; and,
upon detection of a predetermined event, transitioning the filter driver to an unlocked condition, the unlocked condition transmitting the media stream from the camera to a next sequential item of the information handling system.

9. The information handling system of claim 8 wherein:
the filter driver maintains a first position within a filter graph, the filter graph comprising a set of software and middleware components used for multimedia processing.

10. The information handling system of claim 8 wherein:
the locked condition further comprises providing a locked media signal to the next sequential item.

11. The information handling system of claim 10 wherein:
the locked media signal further comprises at least one of a blank screen, a text message, an icon, a static image, and a pixilated video steam.

12. The information handling system of claim 8 wherein:
the filter driver is locked by default, thereby increasing user trust that the camera only transmits the media stream when desired.

13. The information handling system of claim 8 wherein:
the filter driver is unlocked via at least one of a password, a smartcard, user gestures, and a camera media stream received by the camera.

14. The information handling system of claim 8 wherein:
the filter driver is relocked upon detection of a predetermined media signal.

15. A non-transitory computer readable media storing instructions executable by the processor for:
executing a filter driver to control the camera;
maintaining the filter driver in a locked condition so that a media stream from the camera is not passed beyond the filter driver, the maintaining the filter driver in the locked condition providing a camera privacy lock to the camera; and,
upon detection of a predetermined event, transitioning the filter driver to an unlocked condition, the unlocked condition transmitting the media stream from the camera to a next sequential item of the information handling system.

16. The computer readable media of claim 15 wherein:
the filter driver maintains a first position within a filter graph, the filter graph comprising a set of software and middleware components used for multimedia processing.

17. The computer readable media of claim 15 wherein:
the locked condition further comprises providing a locked media signal to the next sequential item.

18. The computer readable media of claim 17 wherein:
the locked media signal further comprises at least one of a blank screen, a text message, an icon, a static image, and a pixilated video steam.

19. The computer readable media of claim 15 wherein:
the filter driver is locked by default, thereby increasing user trust that the camera only transmits the media stream when desired.

20. The computer readable media of claim 15 wherein:
the filter driver is unlocked via at least one of a password, a smartcard, user gestures, and a camera media stream received by the camera.

21. The computer readable media of claim 15 wherein:
the filter driver is relocked upon detection of a predetermined media signal.

* * * * *